Patented Sept. 10, 1946

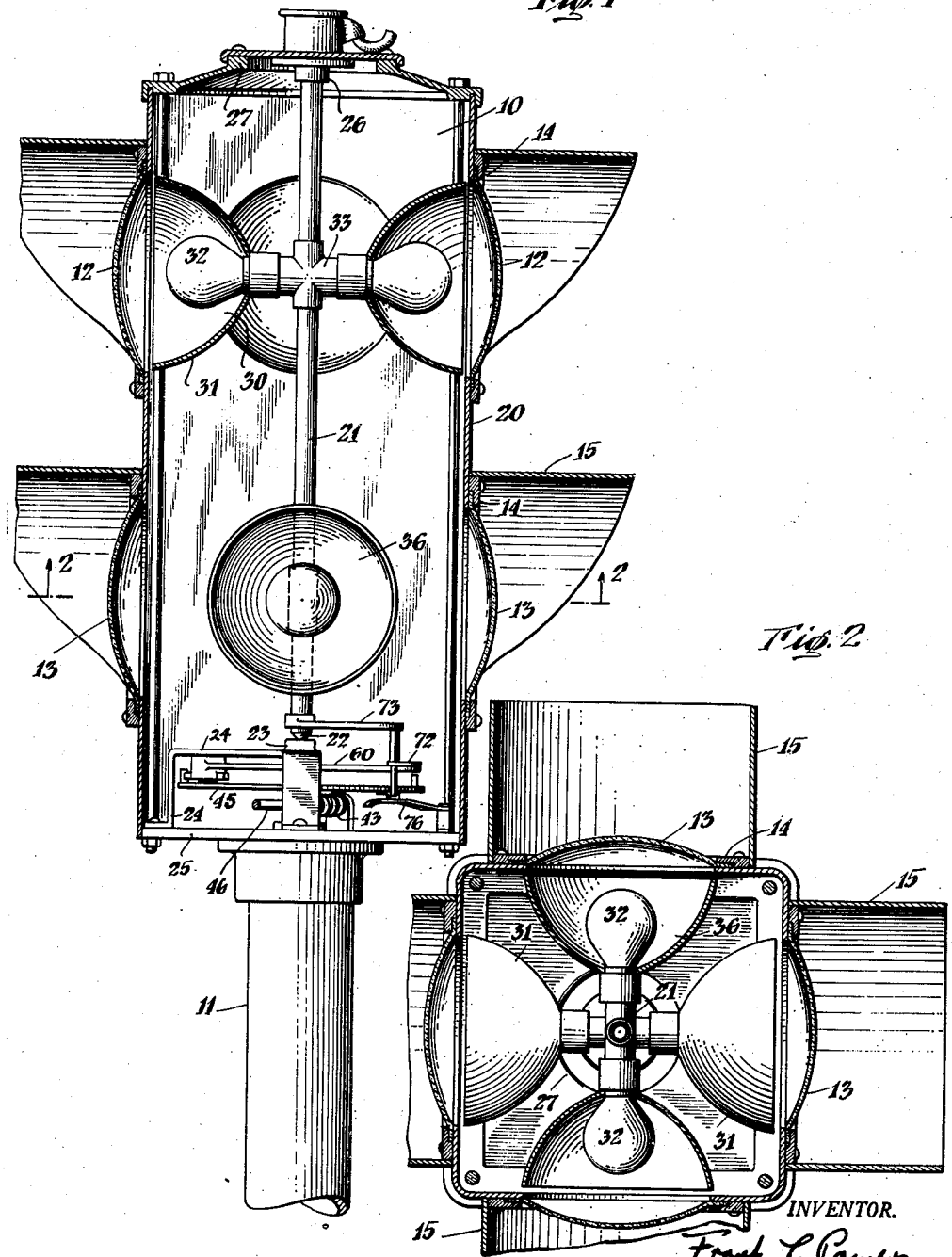

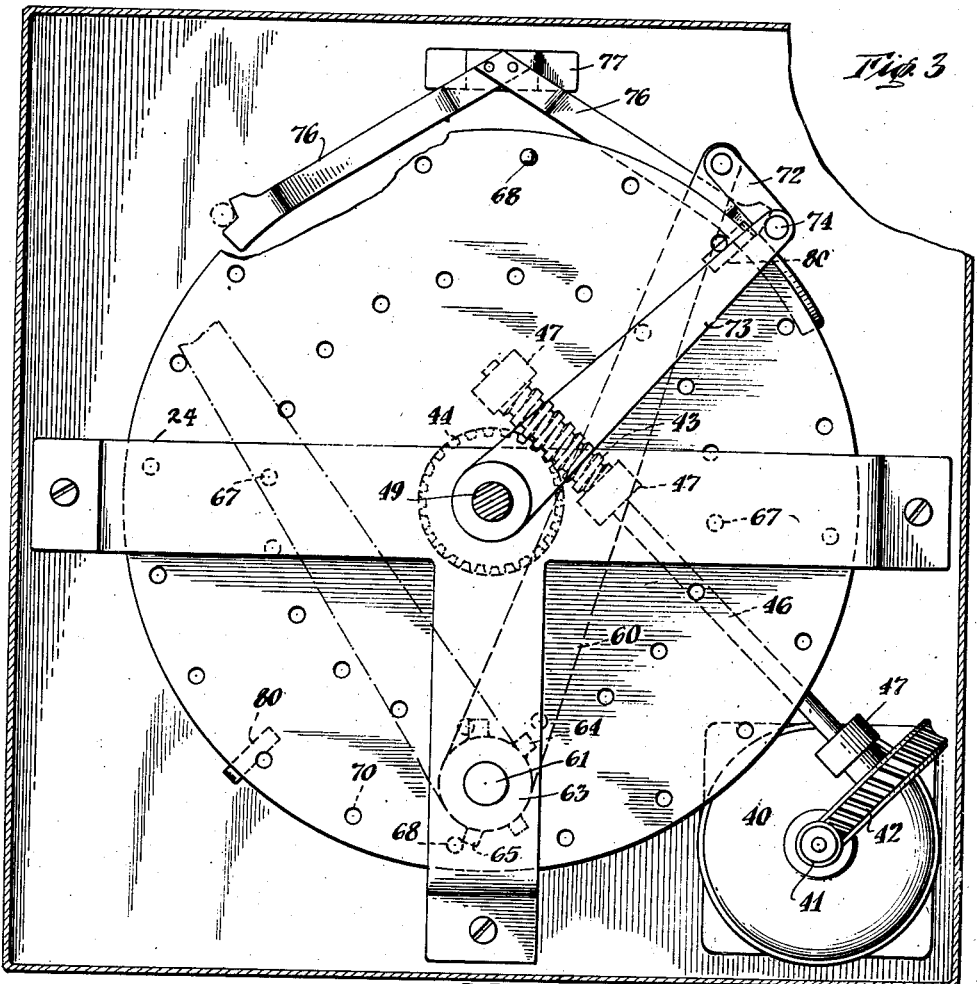

2,407,382

UNITED STATES PATENT OFFICE 2,407,382

TRAFFIC LIGHT

Frank T. Powers, Glen Cove, N. Y.

Application July 21, 1943, Serial No. 495,568

12 Claims. (Cl. 116—63)

The present invention relates to new and useful improvements in connection with signal or traffic lights.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a central vertical section showing a typical and illustrative embodiment of the present invention;

Figure 2 is a fragmentary horizontal section taken on the line 2—2 of Figure 1;

Figure 3 is a detailed sectional view showing the operating mechanism for changing the signal indications; and Figure 4 is a fragmentary detailed vertical sectional view of the parts shown in Figure 3.

The present invention has for its object the provision of a novel and improved traffic light in which the number of lamps is approximately half that required in conventional traffic lights. A further object of the invention is the provision of an improved signal or traffic light in which the transition from green to red, or vice versa is positively indicated, without the use of a yellow or amber light. A further object of the invention is the provision of an improved signal or traffic light which does not require the use of electrical switching mechanism for the change of signals.

In accordance with the illustrative embodiment of the invention, the signal or traffic light includes a rotary or oscillatable vertical shaft carrying a pair of oppositely extending light units, and a lower pair of oppositely extending light units arranged substantially at right angles to the upper units, each light unit preferably comprising an incandescent lamp of the desired wattage and a reflector which not only serves to concentrate the light from the lamp, but also serves to shield the light from the other colored lenses or color filters.

Surrounding the shaft, and in the same general horizontal plane as the upper pair of light units are arranged a set of four colored lenses or light filters facing in equi-angularly spaced directions, the color being red, for instance. This construction is duplicated with respect to the set of lower light units, the lower lenses or filters being green, for instance, and angularly coincident with the upper ones.

A suitable enclosure is provided for protecting the lamp units, operating mechanism, vertical shaft and color filters against weather, as well as for shielding the unilluminated lenses or filters, and any suitable hoods may be provided over the lenses so as to prevent their receiving the direct rays of the sun.

Within the casing and preferably at the bottom are provided means for intermittently and periodically moving the shaft so as to bring the lamp units into operative relationship first with respect to one pair of opposite red lamps and then into operative relation to the other pair of red lamps, etc., the time of alteration being regulable so as to provide for the direct cycling of the lights, and these means preferably cause an oscillation of the vertical shaft supporting the lamp unit through 90° so that while the lights are shifted from one dwell position to another, the lenses which have been illuminated show a diminishing area of illumination at the same time that the other lenses show an increasing area of illumination.

For effecting this intermittent oscillation or alternative actuation of the signals, the vertical shaft is connected through suitable mechanism to a pivoted arm and adjacent the pivoted arm is a slowly rotating disc having on it at least two pins or other members at different distances from the center of rotation, one half of the pins being beyond the pivot of the arm while the other half are closer to the center of the disc than is the pivot of the arm. The arm is provided near its pivot with projections to be engaged by the members or pins on the disc so that the arm is first swung in one direction and after the desired stationary or dwell interval is then swung in the other direction. The pins or members on the disc are variable in their relative angular position, and different numbers of them may be provided so as to vary the time of operation and periods of illumination of the various colored lenses. Stop means are provided for holding the light units and their supporting shaft in either of its dwell positions, and means are also carried by the disc for releasing the locking means when the oscillatory movement is to take place.

Thus the invention provides a compact relatively simple structure which utilizes only four lights for eight colored lenses, as distinguished from the usual provision of eight lights for eight colored lenses controlling a normal street intersection. Furthermore during the transition of the lights from green to red or vice versa, the fact of such transition is positively indicated by the presence of some illumination on both signals thereby avoiding the necessity of the amber or yellow signal. Inasmuch as the light units remain constantly illuminated no electrical switching mechanism is necessary, and the lamp filaments are not subject to breakage such as is normally caused by the frequent switching on and switching off of the filaments.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the traffic light 10 is mounted on a column 11 and is adapted to control the traffic at a four-way intersection by means of a red and green signal in each direction, the red signal being superimposed above the green in each direction.

On each of the four sides of the traffic light 10 are provided two colored lenses or filters 12 and 13, the red lens or filter being designated 12 and the green 13, and these lenses held over suitable apertures by means of retaining rings 14 which may also support substantially conventional hoods or sun shades 15. Thus all of the four color filters 12 on the upper level are red while all of the color filters on the lower level are green. Each of the color filters is preferably concave-o-convex and may or may not be formed with a light concentrating or other lens surface. The lenses are preferably spaced equidistant from a central point, and at 90° to each other. Within the casing 20, and centrally thereof is mounted a vertical shaft 21, the lower end of which is shaped to provide a pivot bearing 22 resting in a pivot cup 23 supported on a bracket 24 fixed to the base plate 25, while the upper end of the shaft 21 is journalled in a bearing 26 which is supported in the cap piece 27.

On the shaft 21 are provided oppositely extending lamp units 30 each lamp unit comprising a reflector 31 and an incandescent lamp 32 both suitably mounted on an extension 33 extending from the shaft, a pair of lamp units being diametrically opposite each other and positioned to register with one or other of the opposite pairs of color filters 12. Below the upper set of lamp units 31 is a similar pair of lamp units 36 which may be duplicates of the upper pair but are angularly spaced so that they extend at right angles to the upper pair, and they are vertically positioned to be alined with one or the other opposite pairs of color lenses 13. With this arrangement the north and south red color filters 12 are illuminated while the east and west green color filters 13 are illuminated. When the shaft and lamp units are moved 90°, the upper east and west red filters 12 are then progressively illuminated and the lower north and south green filters 13 are progressively illuminated.

Within the base of the traffic or signal light are provided means for oscillating the traffic lights and their supporting shaft 21 in the desired cycle of operations. As embodied, a motor 40 rotates at a substantially constant speed, and may be a synchronous motor if desired, and is provided with a worm 41 meshing with worm gear 42 which drives worm 43 meshing with worm gear 44 to drive the main disc 45. Worm 43 and worm gear 42 are mounted on shaft 46 which is journalled in suitable bearings 47. The disc 45 and worm gear 44 are rotatably mounted rigidly on a short shaft 49 which is journalled in bearing 50. Disc 45 is thus rotated at a slow speed, preferably making about one revolution every one, two or three minutes, depending upon the desired timing of the traffic or signal lights.

Means are provided for translating the rotary movement of the disc 45 into oscillatory movement of the shaft 21, and for this purpose a lever 60 is pivoted on stub shaft 61 mounted on the three legged bracket 24 to one side of the shaft 49 near the periphery of disc 45 and is provided with a hub 63 having substantially diametrically oppositely extending projections 64, 65 on its lower edge, which are closely adjacent to the upper surface of the disc 45. On the upper surface of the disc 45 are variably positioned one or more pairs of upwardly extending pins 67, 68 adapted to engage the projections 64 and 65, the pins 67 and 68 being adapted to engage alternately with the projections 64 and 65, as the disc rotates; the pins 67 and 68 being arranged alternately.

Pins 67 and 68 are threaded on their lower portions so that they may be screwed into one or another of the threaded apertures 70 in the disc 45, thereby variably positioning the pins to provide the variable timing for the signals.

A suitable number of apertures 70 are provided so as to provide variations in timing by increments of several seconds.

The outer end of lever 60 is connected to shaft 21 by means of a link 72 pivotally mounted on the end of the lever and also pivoted to a pin 74 extending downwardly from an arm 73 which extends from the shaft 21 and is rigidly fixed thereto so that arm 73 and shaft 21, as well as the lights mounted on shaft 21 are swung 90° each time a pin 67 or 68 engages a projection 64 or 65, thereby giving a relatively quick oscillation to the shaft and lights, after which the lights remain stationary in a dwell position for a considerable period of time until the next pin 67 or 68 is in position to engage the other projection 64 or 65.

Other means are provided for retaining the shaft 21 and its supported light units in the position to which they were moved until the next oscillation is to take place, and for this purpose, a pair of stops are provided engaging with the pin 74 on the end of arm 73. Each stop comprises a leaf spring 76 mounted on a bracket 77 carried by the base plate 25, the ends of the two springs 76 being positioned almost 90° apart as measured on the disc 45 and located at the edge and under side of the disc 45 so as to be deflected downwardly by the lower end of the pin 74 as it passes over first one spring 76 and then the other in its oscillation. Figure 3 of the drawings shows the end of the right hand spring 76 in position of being released from the pin 74.

In order to release the stops 76 just prior to the shaft 21 being oscillated, means are provided for deflecting the springs 76 just prior to the movement of the shaft 21. For this purpose, cam members 80 are provided on the disc 45, extending downwardly from the edge thereof and in position to engage and depress first one spring 76 and then the other and to maintain the spring depressed until the pin 74 has been moved sufficiently so that it is free of the end of the spring. These cam members 80 are also variably positionable and correspond in number to the number of pairs of pins 67 and 68 in use.

As the disc 45 is slowly rotated by the motor 40 from the position shown in Figure 3, cam 80 engages and depresses spring 76, then pin 68 engages the projection 65 to swing the lever 60 and thereby swing lever arm 73 and shaft 21 to change the position of the lights, pin 68 riding off the projection 65 as the lights reach their other extreme position. Pin 74 rides over the other spring 76 and is held in position until the next cam 80 engages the left hand spring 76, at which time the pin 67 engages the projection 64 to swing the lights back to their first position while the left hand spring 76 is held released.

The invention in its broader aspects is not limited to the specific mechanisms shown and described but departures may be made therefrom within the scope of the accompanying claims without departing from the principles of the invention and without sacrificing its chief advantages.

What I claim is:

1. In a signal or traffic light, the combination with a casing of two superposed sets of differently colored filters in the sides of said casing, each set having four filters of one color and a pair of light sources within the casing for each set adapted to illuminate said filters, said light sources in each set being spaced 180° apart, with the light sources for one set spaced 90° from the light sources for the other set, a continuously operating power means, and means periodically operated thereby for so moving the light sources as to cause pairs of opposite filters of each set of filters to be alternately illuminated.

2. In a signal or traffic light, the combination with a casing of two sets of colored filters of different colors in the sides of said casing, the filters being spaced 90° apart, and a pair of light sources within the casing for each set adapted to illuminate said filters, said light sources in each set being spaced 180° apart, and means for periodically and intermittently oscillating the light sources to cause the filters of each set to be alternately illuminated and filters of the sets arranged at an angle of 90° to each other to be illuminated by the respective light sources.

3. In a signal or traffic light, the combination with a casing of two sets of colored filters of different colors in the sides of said casing, the filters being spaced 90° apart, and a pair of light sources within the casing for each set adapted to illuminate said filters, said light sources in each set being spaced 180° apart, and means for periodically and intermittently oscillating the light sources to cause the filters of each set to be alternately illuminated and filters of the sets arranged at an angle of 90° to each other to be illuminated by the respective light sources, said light sources oscillating about a vertical axis and the colored filters being spaced substantially uniformly from said axis and in front of a light source in one of its positions.

4. In a signal or traffic light, the combination with a casing of a vertical member pivotally mounted therein, two pairs of light units each having two normal positions and mounted on said member, the units of each pair being mounted diametrically opposite while the pairs are at different levels and at right angles to each other, colored filter elements in the sides of said casing adapted to overlie the light units in each of their normal positions, and means for moving each of said light units in back of one and then another of said filter elements.

5. In a signal or traffic light, the combination with a casing of a vertical member pivotally mounted therein, two pairs of light units each having two normal positions and mounted on said member, the units of each pair being mounted diametrically opposite while the pairs are at different levels and at right angles to each other, colored filter elements in the sides of said casing adapted to overlie the light units in each of their normal positions, and means for oscillating said light units together to illuminate said filter elements alternately and including an arm fixed to said vertical member and means for engaging said arm periodically and moving it a quarter turn first in one direction and then the other.

6. In a traffic or signal light, the combination with a casing of a vertical shaft pivotally mounted therein and having an upper pair of oppositely extending light units and a lower pair of oppositely extending light units at right angles to the first units, means for intermittently oscillating said shaft a quarter turn and causing it to dwell at the end of each oscillation and colored filter elements in the sides of said casing in front of each dwell position of each light unit.

7. In a traffic or signal light, the combination of a vertical shaft having an upper pair of oppositely extending light units and a lower pair of oppositely extending light units at right angles to the first units, means for intermittently oscillating said shaft a quarter turn and causing it to dwell at the end of each oscillation, including an arm link-connected to the shaft, a constantly rotating disc, and means carried by the disc and engaging the arm to move it periodically and intermittently first in one direction and then the other.

8. In a traffic or signal light, the combination of a vertical shaft having an upper pair of oppositely extending light units and a lower pair of oppositely extending light units at right angles to the first units, means for intermittently oscillating said shaft a quarter turn and causing it to dwell at the end of each oscillation including a pivoted arm connected to the shaft, a constantly rotating disc having pins detachably connected thereto and engageable with the arm on either side of its pivot to move it first in one direction and then the other.

9. In a traffic or signal light, the combination of a vertical shaft having an upper pair of oppositely extending light units and a lower pair of oppositely extending light units at right angles to the first units, means for intermittently oscillating said shaft a quarter turn and causing it to dwell at the end of each oscillation, including a pivoted arm having projections on either side of its pivot, a driven disc eccentric with respect to the arm and carrying variably positionable members engageable with one or another of said projections to move the arm and shaft first in one direction and then the other, the times of movement being determined by the variably positionable members.

10. In a traffic or signal light, the combination with a casing of a vertical shaft pivotally mounted therein and having a pair of oppositely extending light units, a pivoted arm connected to oscillate the shaft between two dwell positions 90° apart and having projections at either side of its pivot, a driven disc eccentric with respect to the arm and carrying variably positionable members engageable with one or another of said projections to move the arm and shaft first in one direction and then the other and colored filter elements in the sides of said casing in front of each dwell position of each light unit.

11. In a traffic or signal light, the combination with a casing of a vertical shaft pivotally mounted therein and having a pair of oppositely extending light units, a pivoted arm connected to oscillate the shaft between two dwell positions, a driven disc eccentric with respect to the arm pivot and carrying variably positionable members engageable to move the arm and shaft first in one direction and then the other and colored filter elements in the sides of said casing in front of each dwell position of each light unit.

12. In a signal or traffic light, the combination with a casing of two sets of colored filters of different colors in the sides of said casing and arranged at different levels, the filters being spaced 90° apart, and a pair of light sources within said casing for each set adapted to illuminate said filters, said light sources in each set being spaced 180° apart and arranged respectively at the different levels, and means for periodically and intermittently moving the light sources to cause the filters of each set to be alternately illuminated.

FRANK T. POWERS.